H. SCHURR.
CAR FENDER.
APPLICATION FILED FEB. 26, 1920.

1,344,213.

Patented June 22, 1920.
5 SHEETS—SHEET 1.

Witnesses
W. C. Fielding
Augustus B. Coppes

Inventor
Henry Schurr
By Joshua R. H. Potts
His Attorney

H. SCHURR.
CAR FENDER.
APPLICATION FILED FEB. 26, 1920.

1,344,213.

Patented June 22, 1920.
5 SHEETS—SHEET 3.

Witnesses
W. C. Fielding
Augustus B. Coppes

Inventor
Henry Schurr
By Joshua R. H. Potts
His Attorney

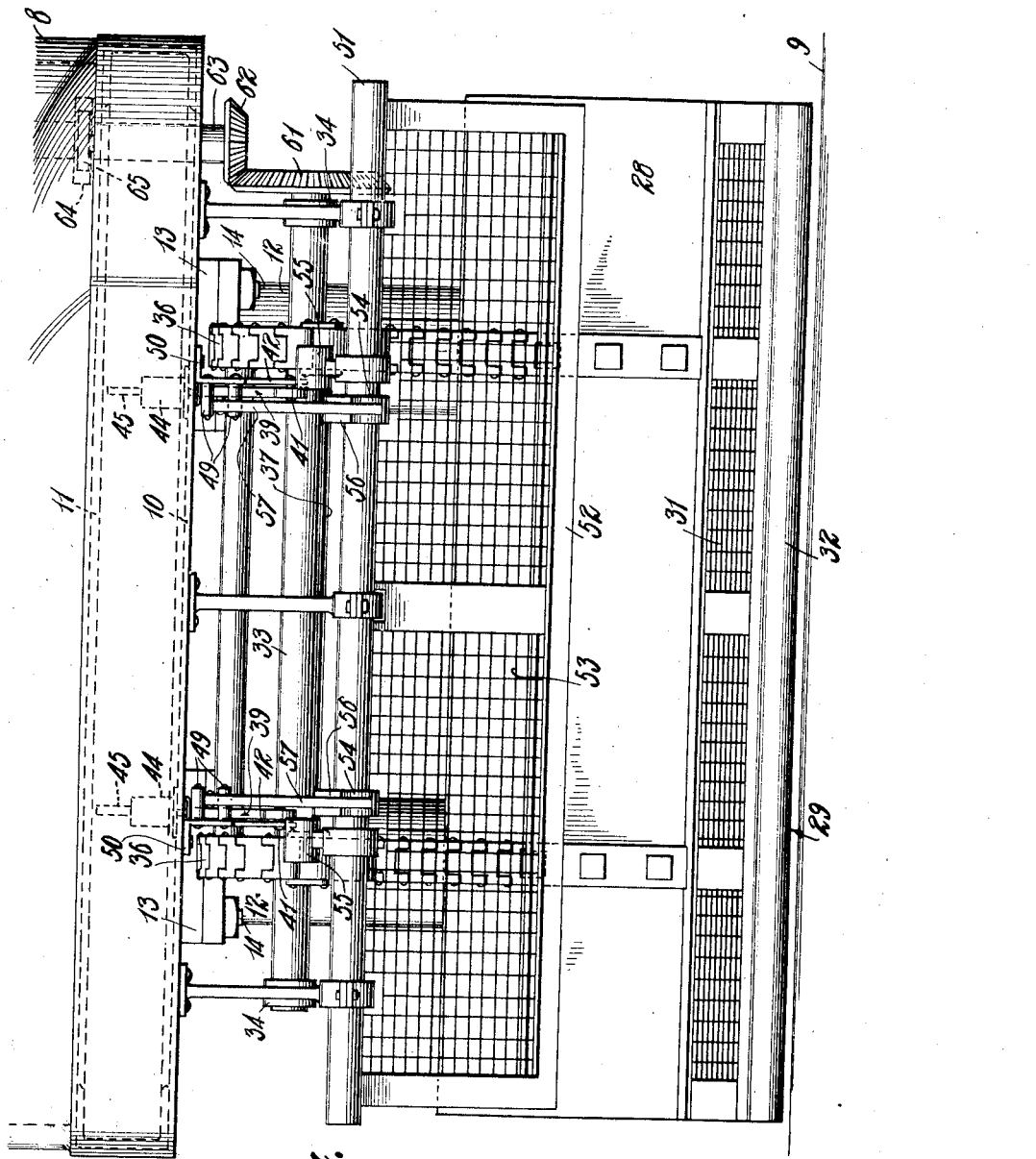

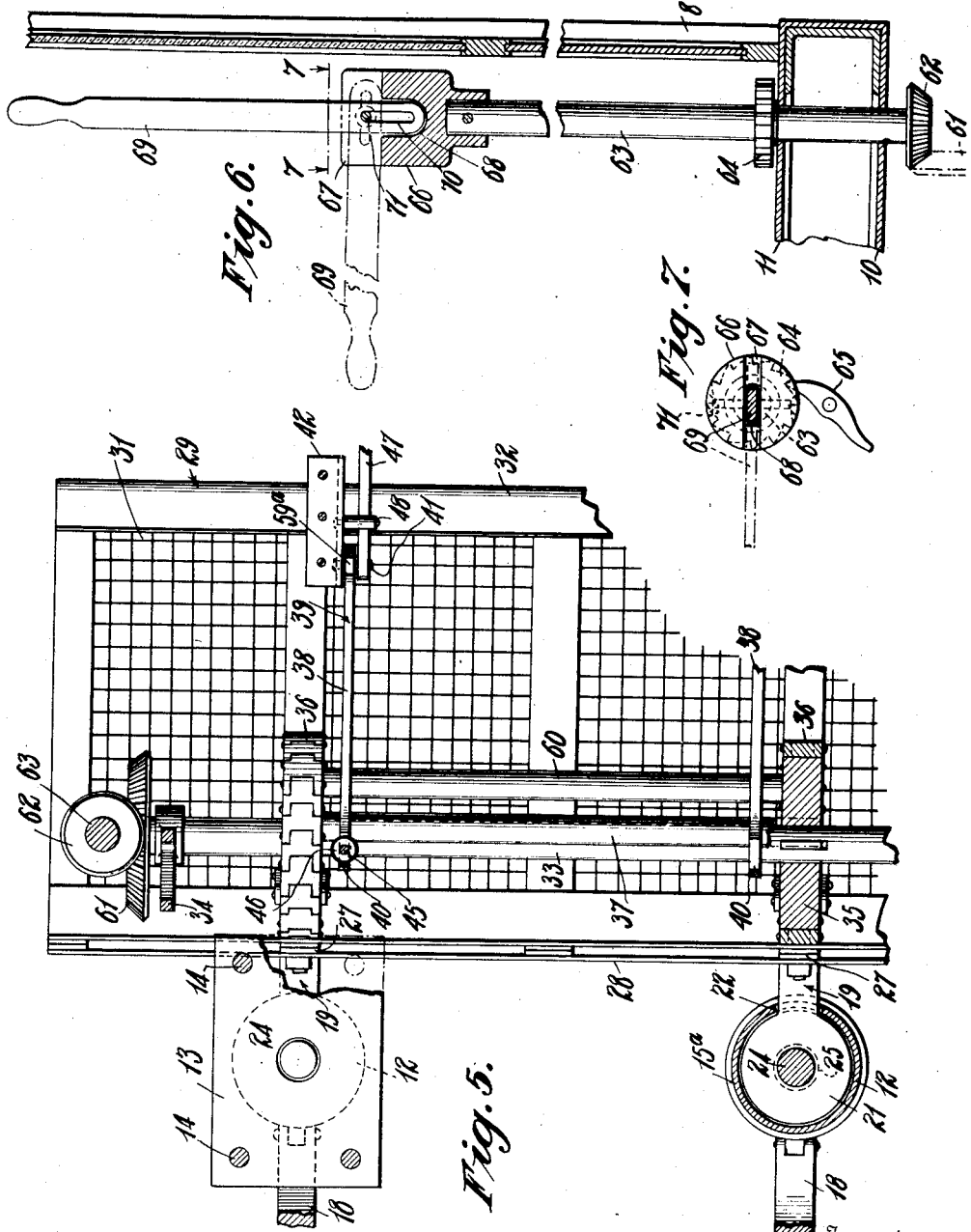

UNITED STATES PATENT OFFICE.

HENRY SCHURR, OF PHILADELPHIA, PENNSYLVANIA.

CAR-FENDER.

1,344,213.

Specification of Letters Patent.

Patented June 22, 1920.

Application filed February 26, 1920. Serial No. 361,381.

*To all whom it may concern:*

Be it known that I, HENRY SCHURR, a citizen of the United States, residing at Philadelphia, in the county of Philadelphia and State of Pennsylvania, have invented certain new and useful Improvements in Car-Fenders, of which the following is a specification.

Numerous types of car fenders have been made prior to my present invention in which a main catch fender is lowered due to the tripping of a gate by a person or object on the track. However, the structure has been such that very often the catch or main fender permitted the object or person to be jammed thereunder and thereby often resulted in disfigurement and loss of life to the person caught thereunder.

One object of my invention is to provide an improved fender for use on trolley cars or the like which will be positive in its action so as to catch a person or object and which will be so constructed that the main or catch fender will be lowered in close proximity to the ground or bed of the track and when once lowered will efficiently serve to prevent a person or object from being wedged thereunder or permitted to pass between the main fender and the roadbed.

Another object is to provide a fender which will be of a practical and durable construction and which can be easily re-set by a motorman so that it will automatically operate as above described.

A still further object is to so construct my improved fender that when once the trip gate is tripped that the main or catch fender will be projected into a flat position close to the surface of the roadbed and will positively remain in said projected position until it is re-set.

These objects, and other advantageous ends which will be described hereinafter, I attain in the following manner, reference being had to the accompanying drawings in which—

Figure 2:
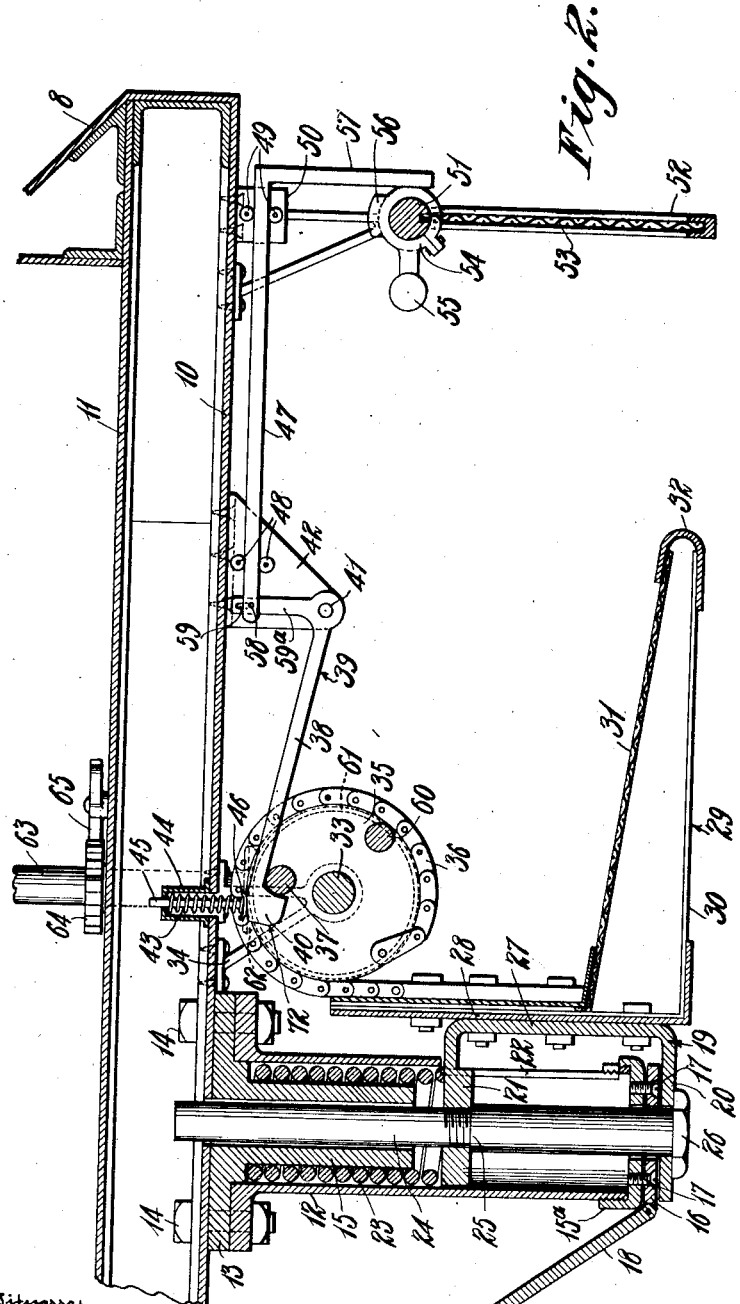
Fig. 2 is a fragmentary sectional elevation of my improved fender showing the parts in their normal position.
Figure 3:
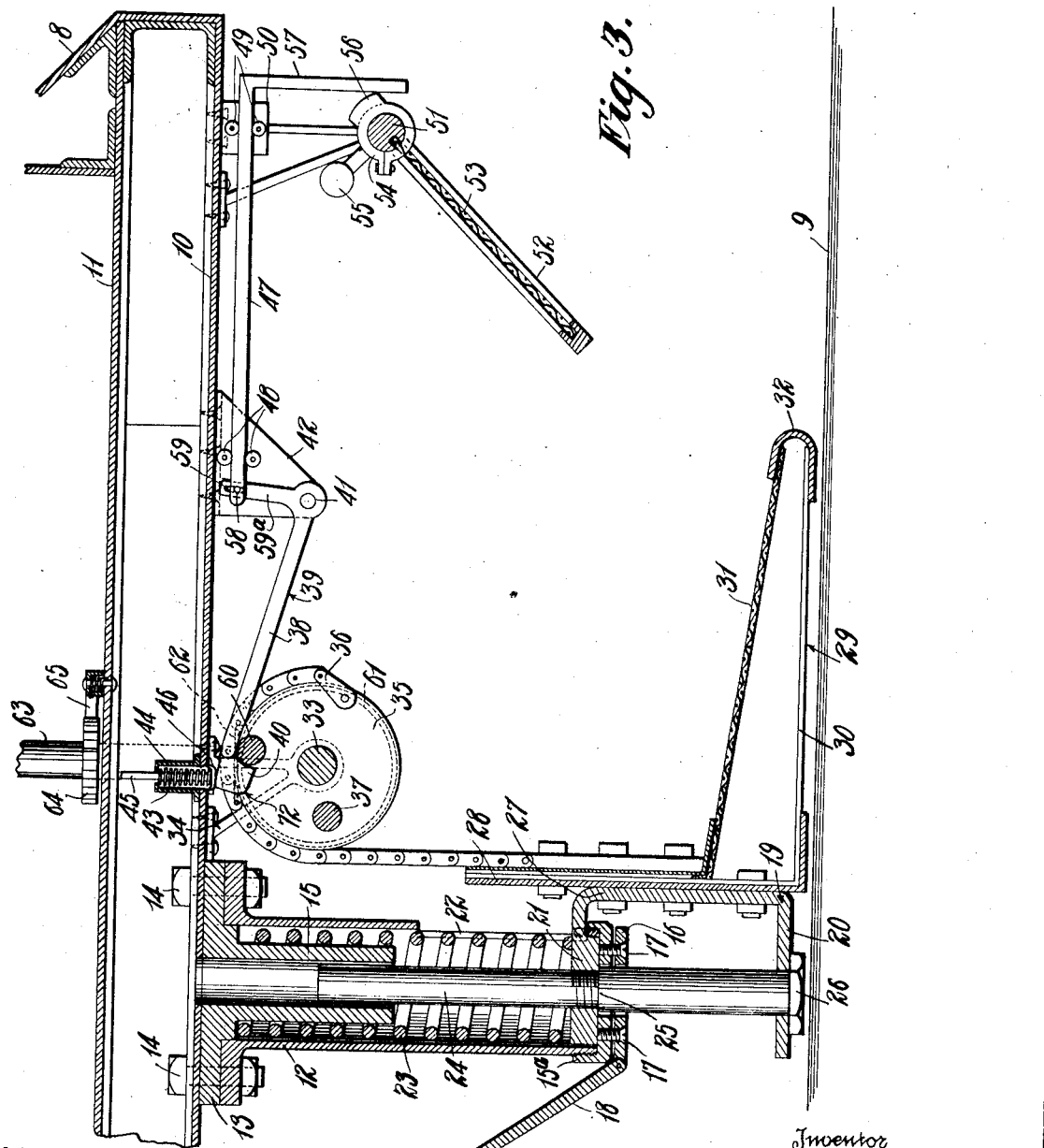

Fig. 3 is a view of similar character to Fig. 2 showing the parts in an operative position having been automatically moved due to the tripping of the trip gate, Fig. 4 is a front elevation of Fig. 3, Fig. 5 is a fragmentary plan view partly in section, Fig. 6 is a sectional elevation of one form of re-setting mechanism which I preferably employ, and Fig. 7 is a fragmentary sectional plan view taken on the line 7—7 of Fig. 6.

Figure 1:
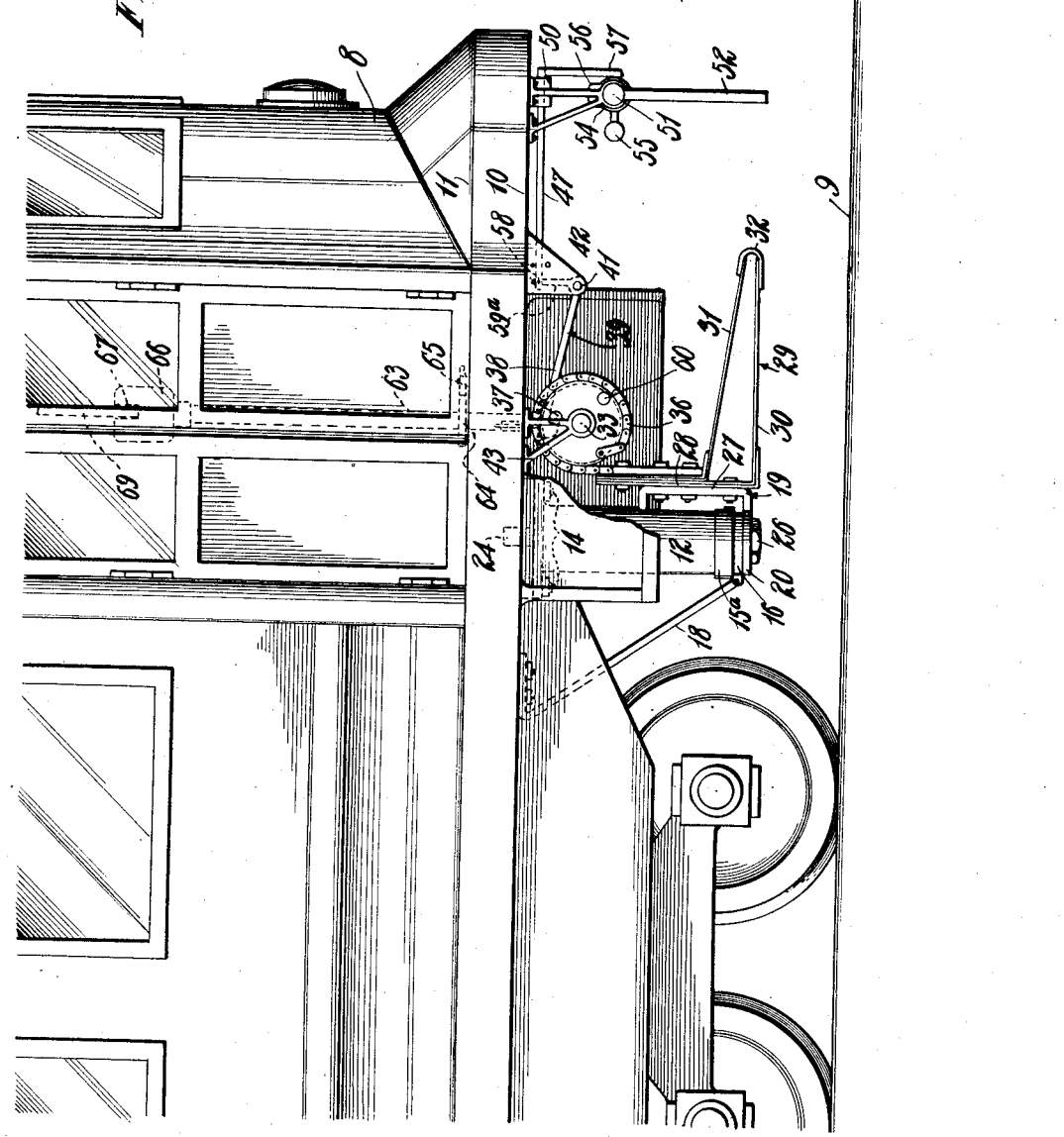
Figure 1 is a side elevation showing my improved fender attached to a car.

Referring to the drawings, 8 represents a car, such for example as an electric street car, which runs on a track 9 and which has a bottom frame 10 supporting a platform 11. Two vertically disposed cylinders 12 have their upper ends closed by heads 13 and these cylinders and heads are secured to the frame 10 by bolts 14. The heads 13 have sleeves 15 which depend into the tops of the cylinders, as clearly shown in Figs. 2 and 3. The lower ends of the cylinders are provided with caps $15^a$ which are screwed thereon; said caps being supported by plates 16 which have screws 17 extending into the caps. The plates 16 are pivotally mounted on the lower ends of braces 18; said braces, as shown in Fig. 1, being secured at their upper ends to the frame 10 of the car.

Two yokes 19 are provided and each of these yokes has an arm 20 which extends under one of the plates 16 and another arm 21 which extends through an opening 22 into a respective cylinder 12; said arm 21 serving as a piston for lowering a main or catch fender as will hereinafter be described. A coiled spring 23 is interposed in each of the cylinders 12 between the head 13 and the piston arm 21. A guide post or plunger 24 extends vertically through each of the cylinders 12 and through holes in the arms 20 and 21. A shoulder 25 is provided on each of the posts 24 for engagement with the lower face of the piston arm 21. The lower ends of the posts 24 have heads 26 for engagement with the lower surfaces of the respective arms 20. The upper end portions of the posts 24 are slidable within the respective sleeves 15 so that the springs 23 are capable, under certain conditions, of moving the yoke 19 from the position shown in Fig. 2 to the position shown in Fig. 3. The upright portions 27 of the yokes 19 are bolted or otherwise secured to a vertical extension 28 on the main or catch fender 29; said main or catch fender being made of skeleton frame work and having its base portion 30 positioned parallel with the track or roadbed 9. The portion 30 of the fender 29 has an open flexible net portion 31 secured above it and the forward portion of the fender 29 is preferably arched or rounded as shown at 32 to provide a flexible buffer.

By making this fender in the above described manner a light weight structure is provided which is sufficiently open or perforated to permit any snow to fall therethrough to the street. A shaft 33 is rotatably mounted in hanger bearings 34 which are secured to the bottom of the car frame 10 and this shaft 33 has two winding drums 35 secured thereto; said winding drums having ends of chains 36 secured thereto; the other ends of said chains being secured to the vertical extension 28 of the main or catch fender 29; the arrangement being such, as shown in Figs. 2 and 3, that the chain extends substantially tangent from the forward face of the vertical extension 28 to the peripheral faces of the winding drums 35.

A retaining rod 37 has its opposite ends secured to the winding drums 35 and an arm 38 of a bell crank lever 39 normally rests on the retaining rod 37 and has a detent head 40 in the form of a hook which engages or embraces the rear portion of the retaining rod, as shown in Fig. 2. The bell crank lever 39 is pivotally mounted at 41 to a bracket 42 which is secured to the bottom of the car frame 10.

A spring 43 is mounted in a housing 44 in the frame 10 and surrounds the stem 45 of a pressure shoe 46; said pressure shoe being in engagement with the top of the arm 38 and serving to hold the detent head 40 in embracing position with the retaining rod 37 when the parts are in their normal position with the spring 23 compressed and the yoke 19 and main or catch fender 29 raised. A slide rod 47 is supported between rollers 49 in the bracket 42 and rollers 49 in a bearing 50; said bearing 50 being secured to the under part of the car frame 10. A rock shaft 51 is mounted in the lower end of the hanger bearing 50 and to this rock shaft is secured a trip gate 52; said trip gate normally depending in a vertical position as shown in Fig. 2 and being made of a frame work having a flexible netting or screening 53.

A collar 54 is secured to the rock shaft 51 and has a weight 55 and a lug cam 56 projecting therefrom; the lug cam being operative and to engage and move forwardly the hooked end 57 of the slide rod 47. The rear end of the slide rod 47 has a pin 58 projecting therefrom and these pins extend into a slot 59 in an upright arm 59ᵃ of the bell crank lever 39.

Under normal conditions the spring 23 tends to move the yoke 19 and main or catch fender 29 downwardly but this action is resisted since the detent head 40 of the bell crank lever 39 prevents rotation of the drums 35 in a contra-clockwise direction. However, when the trip gate 52 is swung rearwardly, for example from the position shown in Fig. 2 to the position shown in Fig. 3, the lug cam 56 will engage and move the hooked end 57 of the slide rod 47 and the slide rod will be moved forwardly so as to rock the bell crank lever 49 so as to lift the detent head 50 out of engagement with the retaining rod 37. The retaining rod thus freed will permit the spring 23 to expand and move the yoke 19 and main or catch fender 29 downwardly in a vertical path into close proximity with the track or roadbed.

A stop rod 60 has its opposite ends secured to the winding drums 35 and this stop rod is located at a greater distance from the shaft 33 than is the retaining rod 37. Thus the stop rod 60 will engage the raised detent head 40 and thereby limit the downward movement of the main or catch fender, as clearly shown in Fig. 3. With the construction as illustrated and as above described it will be noted that a positive vertical movement is imparted to the main fender and the main fender remains in a substantially parallel position at all times with the track or roadbed. Furthermore it is practically impossible with the structure as above described for anything to lift the main fender by engagement with the forward end thereof, since in so doing a leverage would be imparted which would tend to jam the parts within the cylinders and thereby prevent them from being accidentally raised. It will be noted that any object falling on the track in front of the car will engage and swing the trip gate from the position shown in Fig. 2 to the position shown in Fig. 3 and therefore will release the mechanism to permit the spring 23 to act as above described.

In order to re-set the main fender 29 after having been automatically operated I provide the shaft 33 with a bevel gear 61 which meshes with another bevel gear 62 on an upright shaft 63. Said shaft may be similar to an ordinary brake shaft and is provided with a ratchet 64 directly above the platform 11 and a pawl or dog 65 is mounted on the platform and is so constructed that it will release unless held against the ratchet 64. The upper end of the shaft 63, as clearly shown in Figs. 6 and 7, is provided with a head 66 which is slotted transversely as shown at 67 and is also provided with a vertical notch 68.

A hand-lever 69 has a slot 70 adjacent one end and a pin 71 extends through the head 66 and through the slot 70. The pin 71 is positioned to extend transversely across the slot 67 of the head and above the notch 68 so that normally the hand-lever 69 can be positioned vertically as shown in full lines in Fig. 6 and can be lifted and swung into the slot 67 when it is desired to rotate the shaft 63. When it is desired to rotate the shaft, the hand-lever 69 can be lifted until its lower end frees the notch 68 after which it can be swung into the slot 67 of the head and the shaft 63 can be partially rotated and the pawl or dog 65 can be pushed into engagement with the ratchet 64 and held there until the hand-lever has been swung into an opposite position from that shown in dot-and-dash line, after which the shaft 63 can be again turned a part of a revolution. With this construction the shaft 63 can be placed close up to any partition or the front or side of the car and will not take up a great amount of room. It will be noted that when the shaft 63 is thus turned the geared connection will turn the shaft 33 and drums 35 clockwise until the retaining rod 37 engages under the detent head 40 and passes into a position to permit the detent head to again embrace the retaining rod 37 and thereby hold the parts in their set positions.

I preferably curve the detent head 40 as shown at 72 so as to permit, during the re-setting operation, the retaining rod 37 to engage under and lift the detent head 40 against the action of the spring 43 until the retaining rod has passed thereunder, after which the spring 43 will move the detent head 40 downwardly into the embracing position as above described. The trip gate 52 after having been moved rearwardly will again swing into its normal vertical position and this action is assisted by the provision of the weight 55 as above described.

The piston arm 21 of the yoke 29 is preferably in screw threaded connection with the plunger or guide post 24 and if it is desired to remove the parts for any purpose whatever, the plunger can be unscrewed and the plate 16 can be released from the cap 15ª by removing the screws 17 after which the plate 16 can be swung into a vertical position and the cap 15ª can be unscrewed from the cylinder 12. It can then be removed and if desired the spring 23 can be removed from each of the cylinders.

The structure of my improved fender is such that it can be placed upon practically all cars without materially changing the latter and can be easily regulated to suit various requirements.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. Apparatus of the character described including a plunger; means for guiding the plunger in a substantially vertical direction; a fender secured to said plunger; means for automatically moving said plunger downwardly; means for holding said fender against the action of said moving means and including a rotatable shaft, a winding drum on said shaft, a flexible device connected to said fender and said drum, and a detent member operative to prevent rotation of said drum; tripping means operative to move said detent member into an inoperative position to permit said plunger to be moved by its moving means; and means movable in conjunction with said winding drum and in a position adapted to engage said detent member after the tripping action to limit the downward movement of the fender; substantially as described.

2. Apparatus of the character described including a plunger; means for guiding the plunger in a substantially vertical direction; a fender secured to and projecting forwardly of said plunger; means for automatically moving said plunger downwardly; means for holding said fender against the action of said moving means and including a rotatable shaft, a winding drum on said shaft, a flexible device connected to said fender and said drum, and a detent member operative to prevent rotation of said drum; and tripping means operative to move said detent member into an inoperative position to permit said plunger to be moved by its moving means; substantially as described.

3. Apparatus of the character described including a plunger; means for guiding the plunger in a substantially vertical direction; a fender secured to and projecting forwardly of said plunger; means for automatically moving said plunger downwardly; means for holding said fender against the action of said moving means and including a rotatable shaft, a winding drum on said shaft, a flexible device connected to said fender and said drum, a retaining member rotatable in conjunction with said drum, and a detent member movable into embracing position with said retaining member to hold the drum against rotation; and a trip gate operatively connected to said detent member whereby when the trip gate is swung, the detent member will be moved free of the retaining member and said plunger; substantially as described.

4. Apparatus of the character described including a plunger; means for guiding the plunger in a substantially vertical direction;

a fender secured to and projecting forwardly of said plunger; means for automatically moving said plunger downwardly; means for holding said fender against the action of said moving means and including a rotatable shaft, a winding drum on said shaft, a flexible device connected to said fender and said drum, a retaining member rotatable in conjunction with said drum, a bell-crank lever having a detent head, and means for automatically moving and holding said detent head in embracing position with said retaining member; a pivotally mounted trip gate; a cam movable in conjunction with said trip gate; and a slide rod connected to said bell-crank lever and having a portion adapted to be engaged by said cam whereby when the trip gate is swung, the detent head will be moved out of embracing position with said retaining member and the plunger will be free to be moved by its moving means; substantially as described.

5. Apparatus of the character described including a cylinder; a plunger within said cylinder; a spring operative to move said plunger in a substantially vertical direction downwardly; means connected to said plunger and extending outside of said cylinder; a fender connected to said latter means and projecting forwardly of said plunger, said cylinder including a removable cap; a brace; and a plate movably connected to said brace and secured to said cap whereby when the plate is removed from the cap, the cap can be detached from the cylinder; substantially as described.

6. Apparatus of the character described including a plunger; means for guiding the plunger in a substantially vertical direction; a fender secured to and projecting forwardly of said plunger; means for automatically moving said plunger downwardly; means for holding said fender against the action of said moving means and including a rotatable shaft, a winding drum on said shaft, a flexible device connected to said fender and said drum, a retaining member rotatable in conjunction with said drum, and a detent member movable into embracing position with said retaining member to hold the drum against rotation; a trip gate operatively connected to said detent member whereby when the trip gate is swung, the detent member will be moved free of the retaining member and said plunger; and a stop member adapted to engage said detent member after the retaining member has been released and thereby serving to limit the rotatable movement of said winding drum; substantially as described.

In testimony whereof I have signed my name to this specification in the presence of two subscribing witnesses.

HENRY SCHURR.

Witnesses:
 ANNA RENTON,
 CHAS. E. POTTS.